May 2, 1950     S. E. WORBY     2,505,928
TOOL FOR MEASURING AND SETTING OUT ANGLES
Filed April 19, 1946
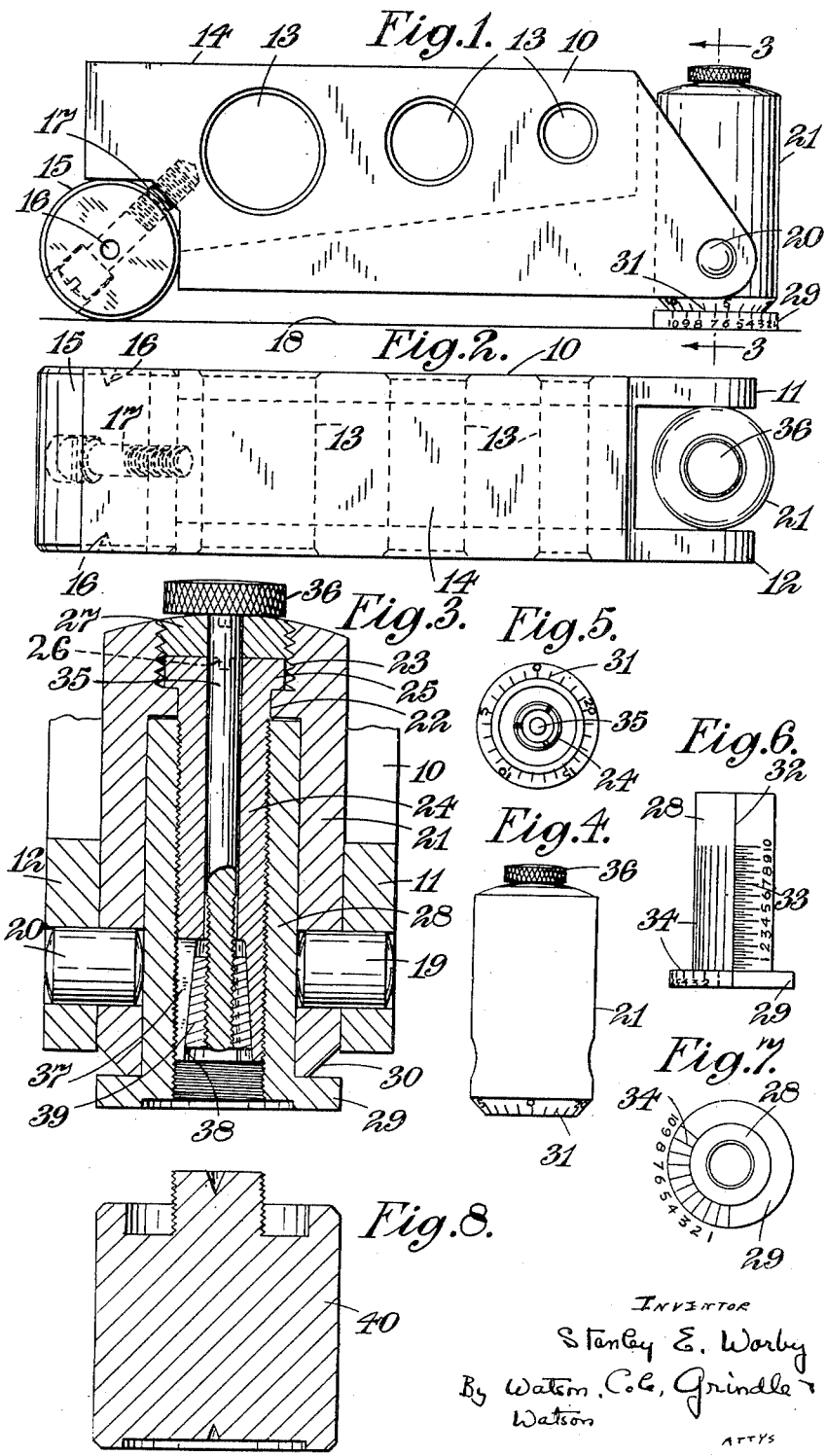
INVENTOR
Stanley E. Worby
By Watson, Cole, Grindle &
Watson
ATTYS Patented May 2, 1950

2,505,928

UNITED STATES PATENT OFFICE 2,505,928

TOOL FOR MEASURING AND SETTING OUT ANGLES

Stanley Edwin Worby, New Barnet, England, assignor to Arthur Moore Limited, New Barnet, England, a British company Application April 19, 1946, Serial No. 663,358
In Great Britain April 24, 1945

2 Claims. (Cl. 33—174)

This invention is for improvements in or relating to tools for measuring and setting out angles.

It is known when measuring or setting out angles in engineering work to employ a bar having a longitudinal indicating surface by which the angles are to be measured or set out, which bar is adapted to rest at two separated bearing positions against a reference surface and to be adjustably tilted in relation to the latter about one of its bearing positions by inserting gauge blocks and slip gauges between the bar and the reference surface at the location of the other bearing position. The distance along the bar between the two bearing positions can be accurately determined and maintained unvarying during the tilting and the thickness of the gauge blocks and slip gauges (measured perpendicularly relatively to the reference surface) can be used in conjunction with the sine table to compute the angle at which the indicating surface of the bar lies in relation to the reference surface) can be used in conjunction with the sine table to compute the angle at which the indicating surface of the bar lies in relation to the reference surface.

The invention has for one of its objects to enable the tilting of the bar to be adjusted with precision in a handier way than has heretofore been possible.

In its preferred embodiment, the invention contemplates the provision of a tool for measuring and setting out angles, comprising a bar having a longitudinal indicating surface by which the angles are to be measured and set out, which bar is adapted to rest at two separated bearing positions against a reference surface and to be adjustably tilted in relation to the latter about one of its bearing positions by varying the distance between the bar and the reference surface at the location of the other bearing position, which tool is characterised in that the bearing position at which the said variation in distance between the bar and the reference surface is effected is provided by a telescoping pillar mounted on the bar, the height of which pillar is adjustable by a fine screwthread with reference to co-operating micrometer gauge markings embodied in the pillar. Thus the invention provides a compact self-contained tool wherein the adjustment in the setting of the bar can be made with great precision.

In its preferred form, the tool is arranged to be used in conjunction with the sine table, although within the scope of the invention, it can be used in conjunction with trigonometrical functions other than the sine of the angle.

It is preferred to arrange that the bearing position about which the tilting of the bar takes place is provided by a cylindrical bearing member whereof the longitudinal axis lies transversely at right-angles to the length of the bar and is so positioned that it and the pivotal axis of the pillar lie at the same distance from the reference surface when the bar is resting on the latter with its indicating surface lying parallel to the said reference surface.

It is advantageous to be able to lock the mechanism in a chosen setting, and it is another object of the invention to provide a novel and improved locking means for effecting this purpose.

For a more complete understanding of the invention, there will now be described, by way of example only and with reference to the accompanying drawings, one construction of tool according to the invention. It is to be understood, however, that the invention is not restricted to the precise constructional details set forth.

In these drawings:

Figure 1 is a side elevation of the tool;

Figure 2 is a plan thereof;

Figure 3 is a section on the line 3—3 of Figure 1 on a scale larger than that of Figure 1;

Figure 4 is a detail elevation of certain of the parts seen from the right-hand end of Figure 1 and on the same scale as that of Figure 1;

Figure 5 is an under-plan of the parts shown in Figure 4;

Figure 6 is an elevation of the sleeve turned through 90° as compared with the position in which it is shown in Figure 1 and on the same scale as that of Figure 1;

Figure 7 is a plan of the sleeve, and

Figure 8 is a section of an extension block on the same scale as that of Figure 3.

Like reference numerals indicate like parts throughout the drawings.

The tool comprises a bar 10 formed with cheeks 11 and 12 and lightening holes 13. The surface 14 is the indicating surface of the bar. At one end the bar is cut away to house a cylindrical bearing member 15 the surface of which is accurately finished. The longitudinal axis of the member 15 lies transversely of the length of the bar. The position of the axis is indicated by the indentations 16. The faces of the bar against which the member 15 seats are accurately finished to ensure that it is located properly. It does not rotate, but is secured to the bar by a stud 17 so that as the bar is tilted the bearing member will turn on and travel slightly along the reference surface shown at 18.

At its other end, the bar has its cheeks accurately transversely drilled to receive pivot pins 19 and 20 which reach into holes in a barrel 21. The pivotal arrangement is such that the barrel is free to turn through a wide angle between the cheeks 11 and 12. As will be seen from Figure 3, the interior of the barrel is formed with a shoulder 22 having a plain cylindrical bore, and with a larger cylindrical bore beyond each end face of the shoulder. The lower one of these larger bores is plain and the upper one is screwthreaded at 23. Received in the barrel is a spindle 24 with an enlarged head 25. The circumference of the head 25 is plain and is of such a diameter as to be received inside the screwthreads 23 without engaging therewith. The head 25 is provided with a screwdriver slot 26 and its underface is intended to abut against an end face of the shoulder 22. Immediately below the head 25 the stem of the spindle is plain and is a press fit in the bore of the shoulder 22. The remainder of the length of the stem is provided with a right-hand screwthread of a pitch of 40 threads per inch. This threaded part of the spindle reaches along the inside of the barrel leaving an annular space between it and the plain interior of the barrel. A securing nut 27 is screwed into the end of the barrel, against the head of the spindle, to hold the latter rigidly in place both against longitudinal and rotary movement relatively to the barrel. An internally screwthreaded sleeve 28 is screwed on to the spindle in the aforesaid annular space with its exterior a sliding fit in the bore of the barrel. The exposed end of the sleeve 28 is formed with an enlargement 29 the underface of which is intended to rest upon the aforesaid reference surface 18.

It will be appreciated that due to its pivotal mounting in the bar 10 the composite pillar is able to seat the enlargement 29 squarely on the reference surface 18 so that the pillar shall stand perpendicular relatively to the latter even though the bar 10 is tilted. The under surface of the enlargement 29 and the surface of the cylindrical member 15 provide the bearing positions for the bar 10 and the longitudinal axis of the member 15 and the pivotal axis of the pillar lie at the same distance from the reference surface 18 when the bar is resting on the latter with its indicating surface 14 lying parallel to the reference surface 18.

The lower end of the barrel 21 is chamfered at 30 and the circumference of this chamfered surface is divided by index markings 31 into 25 equal parts which are numbered in such manner that the zero marking is directed centrally towards the right, as seen in Figure 1. The exterior of the sleeve 28 is provided with a longitudinal zero and reference line 32. On one side of this there is a set of index markings 33 extending longitudinally of the sleeve and indicating the distance travelled per revolution of the sleeve, namely 1/40th of an inch and with larger markings to show every fourth revolution. The larger markings are numbered and the distance between each consecutive pair is .1 inch. The zero of these markings should coincide with the zero in the markings 31 on the barrel when the sleeve 28 is screwed into the barrel so that its enlargement 29 is abutting against the end of the latter in which position if the bar is resting on the reference surface 18 its indicating surface 14 will be parallel to the reference surface. Any necessary adjustment, say for wear, can be effected by removing the securing nut 27 and turning the spindle 24 appropriately by means of the screwdriver slot 26. The other set 34 of index markings on the exterior of the sleeve 28 lie in a vernier arc which is 9/25ths of the circumference of the sleeve and is divided into 10 equal parts. The markings 34 extend around the enlargement 29 and also along the body of the sleeve 28 and commence with the index line 32 aforesaid as the zero. The index marking 34 is so located as to be easily read in conjunction with the aforesaid marking 30 on the barrel and vernier readings can be obtained in a well-known way. Thus the first three places of decimals can be read by the index markings 31 and 33 and the fourth place of decimals can be read by the vernier co-operation of the index markings 31 and 34.

The spindle 24 and securing nut 27 are bored to house the stem of a locking screw 35 whereof the head 36 overlaps the outside of the nut 27 and can bear against the latter for tightening. The lower end of the spindle 24 is longitudinally split, as indicated at 37, in one or more places around its circumference, and its bore is enlarged and tapered as shown at 38 with the tapering walls converging upwardly. The lower end of the stem of the locking screw 35 is threaded to receive a wedging nut 39, the taper of which corresponds with that of the bore 38. The nut will thus expand the split end of the spindle 24 when the locking screw is tightened and will thus maintain the parts of the composite pillar in any chosen relative setting.

There is shown in Figure 8 an extension block 40 which can be screwed into the base of the sleeve 28 in order to deal with larger angles than come within the range of the parts as shown in Figure 3. Extension blocks of different appropriate lengths can be supplied. For example for the construction shown in which the distance along the length of the bar 10 between the longitudinal axis of the bearing member 15 and the pivotal axis of the pillar is 5 inches, four extension blocks could be provided being respectively 1 inch, 2 inches, 3 inches and 4 inches long.

As the tool according to the present invention is for precision work, the parts must be accurately finished.

To use the tool as above described in conjunction with a sine table, if the bar is to be set at some prescribed angle, the sine of that angle is taken from the table and multiplied by 5 (for the reason that the adjustment in the length of the pillar is based on a unit of 1 inch, whereas the pertinent length of the bar is 5 inches). The reading thus obtained is set upon the pillar, with any necessary extension blocks, and it will be seen that as the adjustment can be made to the fourth place of decimals, angular accuracy within one minute is obtainable.

It is to be understood that the invention is not restricted to the precise constructional details set forth.

I claim:

1. In a tool of the class described, which includes an indicating bar having at one end a bearing point adapted to be applied to a reference surface; the sub-combination of an extensible pillar pivotally connected with the opposite end of said bar, said pillar comprising a barrel to which said pivotal connection is applied, the interior of which barrel is formed with a shoulder having a plain cylindrical bore and with a larger cylindrical bore beyond each end face of the shoulder, one of which larger bores is plain and the other screwthreaded, a spindle with an enlarged plain head received in the barrel with its head lying in the said screwthreaded bore in the barrel and the under face of the head abutting against an end face of the shoulder, and with a plain cylindrical portion of its stem which immediately adjoins the head a press fit in the cylindrical bore of the shoulder and with the remainder of the length of its stem finely screwthreaded and lying inside the barrel so as to leave an annular space between it and the plain bore of the barrel, a nut adapted to be screwed into the screwthreaded end of the barrel against the head of the spindle to hold the latter rigidly in place, and an internally screwthreaded sleeve adapted to be screwed on to the spindle so as to lie in the said annular space with its exterior a sliding fit in the bore of the barrel and one end exposed to rest against the reference surface.

2. In a tool of the class described, which includes an indicating bar having at one end a bearing point adapted to be applied to a reference surface; the sub-combination of an extensible pillar pivotally connected with the opposite end of said bearing, said pillar comprising a barrel to which said pivotal connection is applied, the interior of which barrel is formed with a shoulder having a plain cylindrical bore and with a larger cylindrical bore beyond each end face of the shoulder, one of which larger bores is plain and the other screwthreaded, a spindle with an enlarged plain head received in the barrel with its head lying in the said screwthreaded bore in the barrel and the under face of the head abutting against an end face of the shoulder, and with a plain cylindrical portion of its stem which immediately adjoins the head a press fit in the cylindrical bore of the shoulder and with the remainder of the length of its stem finely screwthreaded and lying inside the barrel so as to leave an annular space between it and the plain bore of the barrel, a nut adapted to be screwed into the screwthreaded end of the barrel against the head of the spindle to hold the latter rigidly in place, an internally screwthreaded sleeve adapted to be screwed on to the spindle so as to lie in the said annular space with its exterior a sliding fit in the bore of the barrel and one end exposed to rest against the reference surface, which spindle and securing nut are longitudinally bored with the end of the spindle remote from its head longitudinally split and its bore enlarged and tapered with the tapering walls converging in the direction of the head, a locking screw whereof the stem is housed in the bore in the spindle and securing nut and the head overlaps the outside of the securing nut, and a wedging nut received upon the screw thread on the stem of the locking screw so as to lie inside the said tapered bore, which wedging nut is shaped correspondingly to the said tapered bore so as to expand the split end of the spindle when the locking screw is tightened.

STANLEY EDWIN WORBY.

REFERENCES CITED

The following references are of record in the file of this patent:

UNITED STATES PATENTS

| Number | Name | Date |
|---|---|---|
| 438,504 | Stupakoff | Oct. 14, 1890 |
| 799,533 | Clark | Sept. 12, 1905 |
| 1,033,921 | Morton | July 30, 1912 |
| 1,409,343 | Karasick | Mar. 14, 1922 |
| 1,476,573 | Allen | Dec. 4, 1923 |
| 2,173,519 | Jones | Sept. 19, 1939 |
| 2,317,226 | Syferth | Apr. 20, 1943 |
| 2,344,878 | Jarosz | Mar. 21, 1944 |
| 2,351,773 | Lovenston | June 20, 1944 |